UNITED STATES PATENT OFFICE.

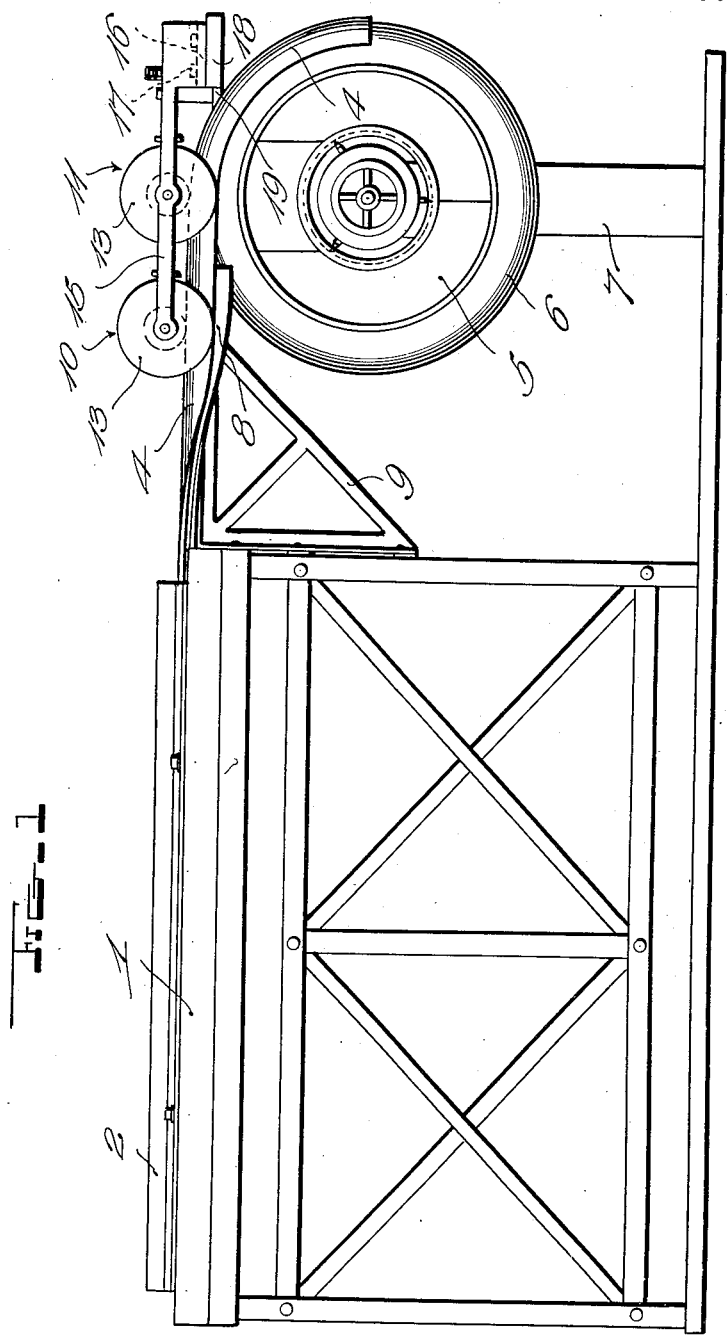

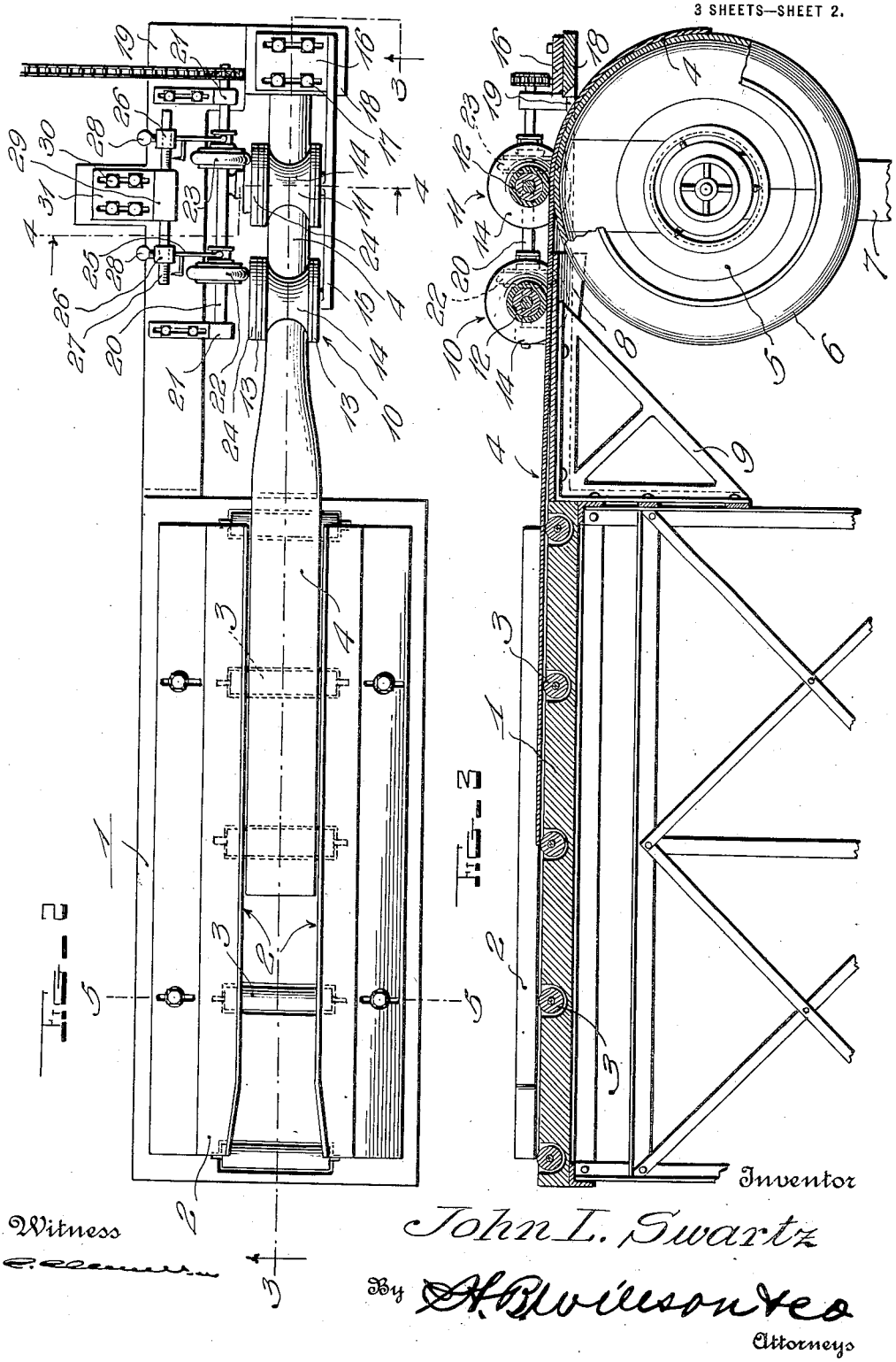

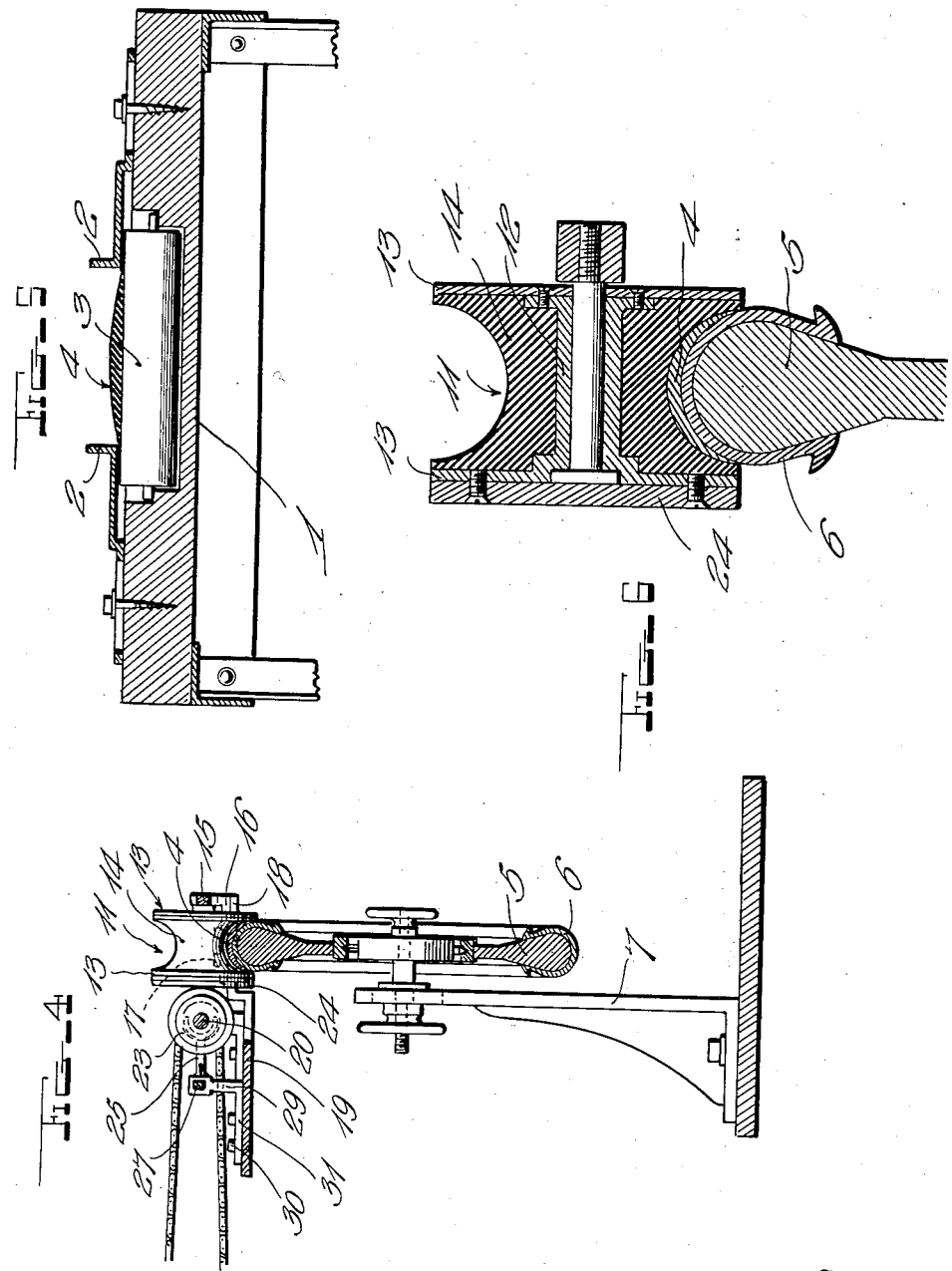

JOHN L. SWARTZ, OF AKRON, OHIO.

TREAD-APPLYING MACHINE.

1,246,488.   Specification of Letters Patent.   Patented Nov. 13, 1917.

Application filed April 5, 1917. Serial No. 159,929.

*To all whom it may concern:*

Be it known that I, JOHN L. SWARTZ, a citizen of the United States, residing at Akron, in the county of Summit and State of Ohio, have invented certain new and useful Improvements in Tread-Applying Machines; and I do declare the following to be a full, clear, and exact description of the invention, such as will enable others skilled in the art to which it appertains to make and use the same.

My invention which relates to improvements in machines for manufacturing vehicle tires, has for its principal object to provide a simple and comparatively inexpensive yet a highly efficient arrangement of parts for applying the treads of pneumatic tires such as those used principally on automobiles and motor-cycles.

Another object is to so construct the machine as to permit the tread to be stretched to any required degree as it is applied to the casing or tire, the stretching process being performed by a pair of tread-applying rollers which may be driven at different speeds.

With the foregoing general objects in view, the invention resides in the novel features of construction and unique combinations of parts to be hereinafter fully described and claimed, the descriptive matter being supplemented by the accompanying drawings which constitute a part of this application and in which:

Figure 1 is a side elevation of the improved machine;

Fig. 2 is a top plan view thereof;

Fig. 3 is a longitudinal section on substantially the plane of the line 3—3 of Fig. 2;

Fig. 4 is a vertical transverse section on the plane of the line 4—4 of Fig. 2;

Fig. 5 is a similar view on the plane of the line 5—5 of Fig. 2;

Fig. 6 is an enlarged section through one of the tread-applying rollers.

In the drawings above briefly described, the numeral 1 designates a table having a pair of parallel guide tracks 2 on its upper side and equipped with transverse rollers 3 between said tracks with their peripheries extending a slight distance above the table, said rollers being adapted to anti-frictionally support the tire tread 4 which is drawn from the table 1 and positioned upon the tire in a manner to be described.

A suitable rotary core 5 is spaced from one end of the table 1 and is so constructed that it may be expanded or contracted within the casing 6 to which the tread 4 is to be applied. The core 5 is rotatably supported on a suitable stand 7 and since the construction of these parts is well known, further description will not be given. The tread is guided to the uppermost portion of the core 5 and shaped properly for application to the casing 6 by means of a suitable matrix 8 extending from the table 1 in line with the rollers 3 and preferably braced by a suitable bracket 9, said matrix being in the form of an elongated plate flat at its inner end but gradually curved into arched formation at its outer end.

A peripherally grooved feed roller 10 operates above and conforms to the shape of the inner end of the matrix 8 whereas a similar roller 11 is mounted above the core 5, both of these rollers preferably having hubs 12, end flanges 13, and a tread 14 of yielding rubber or the like surrounding said hub between the flanges. It is the office of the two rollers 10 and 11 to remove the tread 4 from the table 1 and apply it to the casing 6, a suitable medium being employed to cause said tread and casing to adhere; and it is intended that the rollers in question may be driven at different speeds to cause them to stretch the tread a greater or less amount or to apply it without stretching as occasion may demand.

Both rollers 10 and 11 are shown mounted on a horizontal arm 15 having a foot 16 at one end which is adjustably secured by bolt and slot connections or the like 17 to an arm 18 projecting laterally from the outer end of a bracket plate 19 which extends from the adjacent end of the table 1. Both rollers are detachable in order that others of smaller or larger dimensions may be substituted therefor, according to the size of tire being treaded and it is when making such changes that the adjustable connections 17 are used to properly position the rollers above the core 5.

A driven shaft 20 is supported in bearings 21 mounted on the bracket plate 19 and adjustable toward and away from the rollers 10 and 11, said shaft being at right angles to the axes of said rollers as shown in Fig. 2 and carrying friction wheels 22 and 23 for driving the rollers 10 and 11 respectively, one end of each of said rollers having a friction disk 24 secured thereto for contact with the wheels 22 and 23. Both of said wheels are keyed slidably on the shaft 20 and may be adjusted toward or away from the centers of the rollers 10 and 11 to drive the latter at any suitable speed, and although any preferred means could well be employed for making these adjustments, arms 25 are shown provided at one end with sleeves 26 mounted on a longitudinal bar 27, said arms having a running connection with the wheels 22 and 23. The bar 27 is by preference graduated and set screws or the like 28 are provided to lock the sleeves 26 in adjusted position thereon.

Bar 27 could well be mounted in any requisite manner but is preferably carried by a foot 29 having bolt and slot connections or the like 30 with the bracket plate 19 or a lateral extension 31 thereof. The connections 30 and the adjustability of the bearings 21 come into play when longer or shorter rollers 10—11 are applied to the machine and it is to be understood that any required adjustments could well be employed, those described being for illustrative purposes only. Furthermore, although the bracket plate 19 provided with lateral extensions 18 and 31 has been illustrated and described, any suitable support may be employed for the several parts.

In operation, core 5 is contracted and the casing 6 is then placed over the same, whereupon said core is again expanded. The tread 4 is now laid on the table 1 between the tracks 2 and since it is supported by the rollers 3 it will move easily and will not be unduly stretched, when the rollers 10 and 11 come into play to feed said tread to the casing, at the same time turning the latter and the core 5. If it is not required to stretch the tread as it is applied, the two friction wheels 22 and 23 will be set at the same distance from the centers of the two rollers 10 and 11. The speed with which the tread is applied may also be controlled by shifting said wheels toward or away from said centers.

If it is required to stretch the tread 4 as it is applied to the casing 6, the wheel 22 will be adjusted nearer the periphery of roller 10 than the distance which wheel 23 is spaced from the periphery of the other roller 11. The front roller will thus be driven at a higher rate of speed than the rear roller with the result that the tread will be stretched between the two, the amount of stretching being controlled by the relative speeds of the two rollers.

From the foregoing, taken in connection with the accompanying drawings, it will be obvious that although the improved machine is of comparatively simple and inexpensive nature, it will be highly efficient and durable. Since the best results are accomplished by the general arrangement of parts shown, this arrangement constitutes the preferred form of the improved machine. It is to be understood, however, that within the scope of the invention as claimed, numerous changes may be made without sacrificing the principal advantages.

I claim:

1. In a tread applying machine, the combination of a rotatably mounted tire support, a roller for feeding the tread to a tire on said support, a second roller for applying the tread to the tire, and means independent of the tread for simultaneously driving the two rollers at different speeds.

2. In a tread applying machine, the combination of a rotatably mounted tire support and a tread support adjacent the same, a mandrel extending from said tread support to said tire support, a roller coacting with said mandrel to feed the tread onto a tire mounted on said support, a second roller for applying the tread to the tire, and means independent of the tread for simultaneously driving the two rollers at different speeds.

3. In a tread applying machine, the combination of a rotatable tire support, a roller for feeding the tread to a tire on said support, a second roller for applying the tread to the tire, a pair of friction wheels contacting with the ends of said rollers and shiftable toward and from the centers thereof, and common actuating means for said friction wheels.

4. In a tread-applying machine, the combination of a tread support, a rotatable tire support adjacent the same, a matrix extending between said tread and tire supports, a pair of tread handling rollers operating adjacent said matrix and said tire support respectively, a driven shaft, and friction wheels adjustable along said shaft and contacting with one end of said rollers.

In testimony whereof I have hereunto set my hand in the presence of two subscribing witnesses.

JOHN L. SWARTZ.

Witnesses:
  JACOB HEDDESHEIMER,
  WALTER J. HELMKAMP.